US010532368B2

(12) United States Patent
López et al.

(10) Patent No.: US 10,532,368 B2
(45) Date of Patent: Jan. 14, 2020

(54) FLUID EJECTION DEVICE

(71) Applicant: Fico Transpar, S.A., Barcelona (ES)

(72) Inventors: Miguel Mota López, Rubí (ES); Olallo Alcaide Hernández, El Prat de Llobregat (ES)

(73) Assignee: FICO TRANSPAR, S.A., Barcelona (ES)

( * ) Notice: Subject to any disclaimer, the term of this patent is extended or adjusted under 35 U.S.C. 154(b) by 0 days.

(21) Appl. No.: 16/022,661

(22) Filed: Jun. 28, 2018

(65) Prior Publication Data

US 2018/0304280 A1 Oct. 25, 2018

Related U.S. Application Data

(63) Continuation-in-part of application No. 15/657,695, filed on Jul. 24, 2017.

(30) Foreign Application Priority Data

Jul. 22, 2016 (EP) ..................................... 16382358

(51) Int. Cl.
*B05B 1/00* (2006.01)
*B05B 1/16* (2006.01)
(Continued)

(52) U.S. Cl.
CPC ............. *B05B 1/1672* (2013.01); *B05B 1/04* (2013.01); *B05B 1/205* (2013.01); *B60S 1/528* (2013.01); *B60S 1/56* (2013.01); *B08B 3/02* (2013.01)

(58) Field of Classification Search
CPC .......... B05B 1/04; B05B 1/08; B05B 1/1672; B05B 1/205; B60S 1/52; B60S 1/528
(Continued)

(56) References Cited

U.S. PATENT DOCUMENTS 1,815,880 A * 7/1931 Buckner ................... B05B 3/06
239/240
3,263,929 A * 8/1966 Seablom ................ B05B 15/74
239/204
(Continued)

FOREIGN PATENT DOCUMENTS

EP 0572147 A1 12/1993
EP 1506109 A1 2/2005
(Continued)

OTHER PUBLICATIONS

Search Report and Written Opinion regarding related EP App. No. 16382358.6; dated Feb. 22, 2017; 8 pgs.

*Primary Examiner* — Viet Le
(74) *Attorney, Agent, or Firm* — Cantor Colburn LLP

(57) ABSTRACT

A fluid-ejection device includes a first member having a fluid inlet; a second member that can be moved relative to the first member; and a control member arranged to be at least in a first condition, in which the control member is at least substantially inside the second member during a first stroke of the second member in which fluid flow through the second member and discharge is prevented; and a second condition, in which the control member is at least substantially outside the second member during a second stroke of the second member, allowing fluid flow through the second member and discharge. A seal member has a first surface engaged with the first member, a second surface engaged with the second member, and a third surface arranged to be engaged with the control member in the first condition.

20 Claims, 3 Drawing Sheets

(51) Int. Cl.
*B05B 1/04* (2006.01)
*B60S 1/52* (2006.01)
*B60S 1/56* (2006.01)
*B05B 1/20* (2006.01)
*B08B 3/02* (2006.01)

(58) Field of Classification Search
USPC .................. 239/184.1, 284.2, 203, 204, 205
See application file for complete search history.

(56) References Cited

U.S. PATENT DOCUMENTS

| | | | | |
|---|---|---|---|---|
| 3,331,292 A | * | 7/1967 | Seablom | F15B 15/1466 |
| | | | | 92/108 |
| 4,254,913 A | * | 3/1981 | Georgiev | B05B 15/70 |
| | | | | 239/204 |
| 4,939,797 A | * | 7/1990 | Goettl | E04H 4/169 |
| | | | | 4/490 |
| 5,242,114 A | * | 9/1993 | Camier | B60S 1/528 |
| | | | | 239/284.2 |
| 5,605,286 A | * | 2/1997 | Orth | B60S 1/528 |
| | | | | 239/284.2 |
| 5,762,271 A | * | 6/1998 | Lind | B05B 1/304 |
| | | | | 239/284.2 |
| 5,803,365 A | * | 9/1998 | Ruttenberg | B05B 15/70 |
| | | | | 239/204 |
| 5,921,322 A | * | 7/1999 | Bonfield | A62C 37/09 |
| | | | | 169/37 |
| 6,000,632 A | * | 12/1999 | Wallace | B05B 15/00 |
| | | | | 239/204 |
| 6,296,198 B1 | * | 10/2001 | Tores | B60S 1/481 |
| | | | | 239/284.1 |
| 6,481,644 B1 | * | 11/2002 | Olsen | A62C 31/03 |
| | | | | 169/37 |
| 6,752,329 B1 | * | 6/2004 | Price | B60S 1/528 |
| | | | | 239/284.2 |
| 6,905,078 B1 | * | 6/2005 | Gattuso | B05B 3/0413 |
| | | | | 239/11 |
| 6,951,223 B2 | * | 10/2005 | Fukushima | B60S 1/481 |
| | | | | 134/186 |
| 7,318,556 B2 | * | 1/2008 | Lee | B05B 15/70 |
| | | | | 239/572 |
| 8,905,328 B2 | * | 12/2014 | Hartnell | B60S 1/603 |
| | | | | 239/203 |
| 8,967,495 B2 | * | 3/2015 | Hamza | B05B 11/3001 |
| | | | | 239/284.2 |
| 2003/0047621 A1 | * | 3/2003 | Fukushima | B60S 1/481 |
| | | | | 239/284.1 |
| 2003/0116645 A1 | * | 6/2003 | Hirose | B60S 1/528 |
| | | | | 239/284.2 |
| 2004/0074988 A1 | * | 4/2004 | Sternbach | B05B 1/046 |
| | | | | 239/284.1 |
| 2004/0188541 A1 | * | 9/2004 | Maruyama | B60S 1/481 |
| | | | | 239/284.1 |
| 2005/0178852 A1 | * | 8/2005 | Yon | B60S 1/52 |
| | | | | 239/284.1 |
| 2005/0236496 A1 | * | 10/2005 | Lasebnick | B05B 1/3006 |
| | | | | 239/284.1 |
| 2006/0289678 A1 | * | 12/2006 | Sakai | B60S 1/528 |
| | | | | 239/284.2 |
| 2008/0142619 A1 | * | 6/2008 | Kim | B05B 1/08 |
| | | | | 239/284.1 |
| 2008/0210780 A1 | * | 9/2008 | Discher | B60S 1/528 |
| | | | | 239/284.2 |
| 2009/0014555 A1 | * | 1/2009 | Litvinov | B05B 1/3436 |
| | | | | 239/284.2 |
| 2011/0215173 A1 | * | 9/2011 | Hartnell | B60S 1/528 |
| | | | | 239/284.2 |
| 2015/0375717 A1 | * | 12/2015 | Kracker | B60S 1/528 |
| | | | | 134/18 |
| 2016/0144831 A1 | * | 5/2016 | Caillot | B60S 1/481 |
| | | | | 239/1 |
| 2018/0021792 A1 | | 1/2018 | López et al. | |

FOREIGN PATENT DOCUMENTS

| | | |
|---|---|---|
| EP | 169451 | 6/2005 |
| FR | 2796866 A1 | 2/2001 |
| FR | 3021014 | 5/2014 |

* cited by examiner

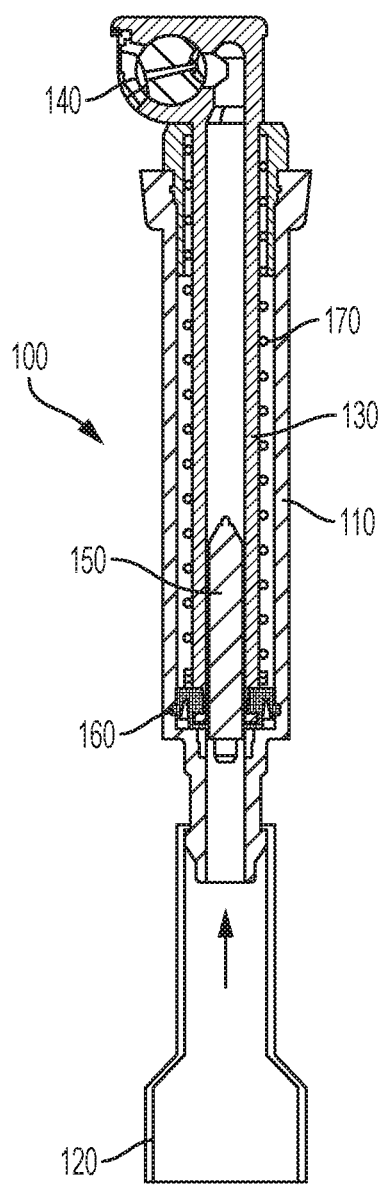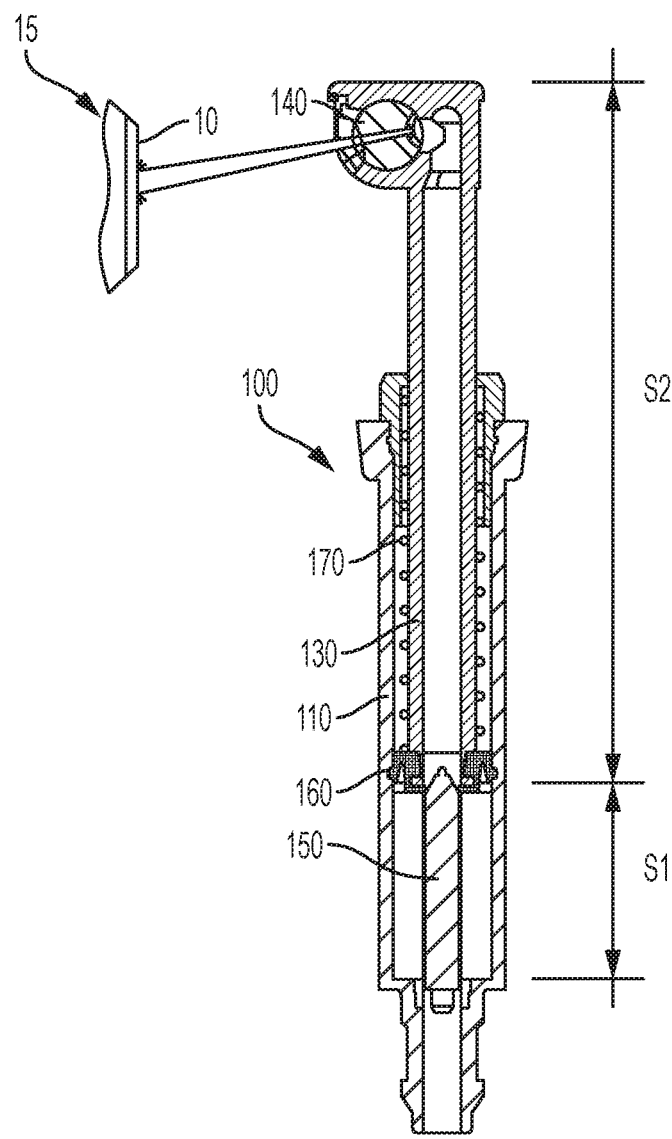
FIG. 1
FIG. 2

FLUID EJECTION DEVICE

CROSS-REFERENCE TO RELATED APPLICATION

This is a continuation-in-part of U.S. patent application Ser. No. 15/657,695, filed Jul. 24, 2017, which claims priority to European patent application no. EP16382358.6, filed on Jul. 22, 2016, the disclosures of which are incorporated herein by reference in their entireties.

BACKGROUND

The present disclosure relates to fluid-ejection devices intended for washing for example surfaces of parts in motor vehicles and for many other applications.

Fluid-ejection devices are known in the art for washing surfaces of parts in motor vehicles such as for example motor vehicle headlights, lenses, sensors, etc. The main problem found in said devices known so far is that certain areas or parts can not be fully reached. As a consequence, they are not washed, or they cannot be washed properly, e.g. incompletely washed.

A number of alternative solutions have been proposed in the art for addressing the above problems. Examples of said alternative solutions are orientable nozzles and telescopic assemblies.

Prior art orientable nozzles have been shown to be ineffective due for example to the presence of external parts or accessories that may be provided in the path of the liquid being ejected. Again, certain areas or parts cannot be reached and therefore they cannot be washed adequately, while other areas cannot be completely washed.

Known telescopic devices comprise a hollow cylinder, a hollow piston and a nozzle connected to the hollow piston. The hollow piston is driven to be displaced relative to the hollow cylinder as a cleaning liquid is injected therein. Once the hollow piston with the nozzle has been extended, the cleaning liquid is ejected through the nozzle out onto the surface to be washed. While such known telescopic devices have been shown to at least partially overcome the above problems, they are still complex and in some cases they are not able to perform an efficient washing as required.

Examples of telescopic devices for washing surfaces in motor vehicles are disclosed in EP1694541 and EP1506109. The washing device disclosed in EP1694541 comprises a hollow cylinder, a hollow piston and a nozzle connected thereto. The hollow piston is arranged to slide inside the hollow cylinder against a spring as it is driven by a liquid that is fed therewithin. The liquid is then ejected only when the piston has reached a predetermined extended position. The washing device disclosed in EP1506109 comprises an inner hollow cylinder, an outer hollow cylinder fitting into each other and a telescopic nozzle. The inner hollow cylinder comprises an opening for conducting liquid that remains closed as it abuts the outer hollow cylinder. Cleaning liquid is supplied when the telescopic nozzle is completely telescoped.

Another telescopic washing device for projecting a cleaning liquid to a surface of a motor vehicle is disclosed in FR3021014. The telescopic washing device in this case also comprises a fixed member, a movable member and a seal. The movable member is initially retracted and then liquid enters through an inlet port of the fixed member to fill a chamber formed therein. This causes the movable member to be displaced against a spring with an elastically deformable portion of the seal leaning against a first section of the control member such that liquid is still inside chamber under pressure and it is not allowed to flow outside. When the movable member reaches a position where the elastically deformable portion of the seal leans against a second section of the control member having passages, the liquid is allowed to flow through said passages into the control member allowing the liquid to be ejected outside.

The above prior art telescopic washing devices have a number of disadvantages. For example, the washing devices described in EP1694541 and EP1506109 require the stroke of the nozzle to be accurately designed for each specific condition, i.e. a specific type and/or location of the surface to be washed, a specific position and size of the nozzle, the pressure of the liquid that is injected, etc. As a result, such washing devices involve expensive designs and in some cases may be inefficient. In the telescopic washing device disclosed in FR3021014 the control member should be designed according to the stroke to be travelled by the movable member which in some cases may be long resulting again in undesirably complex and capital intensive devices.

There is thus a need for efficient fluid-ejection devices to be used for washing surfaces of parts in motor vehicles and other applications which is in turn simple in structure as well as cost effective in design and manufacturing.

BRIEF DESCRIPTION OF THE INVENTION

A fluid-ejection device is provided herein with which the above need is fulfilled while additional advantages are obtained. The present fluid-ejection device is adapted to eject a fluid such as a washing liquid, a washing gas, a combination of washing liquids, a combination of washing gases, a combination of washing liquid (or liquids) and gas (or gases) etc. against a surface to be washed, flushed, rinsed, etc.

The present fluid-ejection device comprises first and second members and a source of said pressurized fluid. The first member is adapted to be connected to the source of pressurized fluid and the second member is arranged such that it can be moved relative to the first member when it is driven by the fluid that is supplied by the above mentioned source of pressurized fluid.

A control member is also provided. The control member may be a part of the first member, e.g. formed integral with, or it may be attached thereto. The control member may be arranged to be at least in a first condition and in a second condition depending on the position of the second member. In the first condition, the control member is at least substantially inside the second member preventing the flow of fluid through the second member defining a first stroke of the second member along or during which no discharge of fluid is allowed out of the fluid-ejection device. In the second condition, the control member is at least substantially outside the second member allowing the flow of fluid through the second member defining a second stroke of the second member along or during which discharge of fluid is allowed out of the fluid-ejection device.

An advantageous feature of the present fluid-ejection device is the provision of different strokes for the second member. The discharge of fluid out of the fluid-ejection device is thus suitably controlled such that a broad range of different surfaces of parts in motor vehicles regardless of their shape such as camera lenses, sensors, vision and detection elements, and other parts installed in vehicles as well as in many other applications can be washed efficiently. For example, by providing for an initial displacement of the second member, i.e. the above mentioned first stroke, during which no fluid is ejected outside the fluid-ejection device, areas which must be prevented from getting wet are advantageously avoided such that they are not damaged.

The control member may be adapted to be at least partially inserted inside the second member. This may be carried out by varying the height of the control member as required, that is, such that the height of the control member substantially corresponds to said initial displacement, i.e. the first stroke, of the second member during which no fluid is ejected outside the device.

A further advantage of the present fluid-ejection device is derived from the above mentioned feature that the control member may be adapted to be at least partially inserted inside the second member. This allows the section for the passage of fluid to be precisely varied. In some cases, the control member may be adapted to be arranged out of inside the second member, that is, not inserted therein. As a result, a longer fluid-ejection device can be made without having to design a larger control member. Consequently, important material savings can be advantageously achieved.

In some examples, the control member may comprise a post or similar element. The post may be hollow and provided with holes, i.e. through holes, through which fluid is allowed to be discharged into the second member. Said holes may be formed at side portions of the post at different heights. Other different hole formations and arrangements are possible.

In general, it may be preferred that a section for the passage of fluid through the first member increases along the direction of movement of the second member to discharge fluid out of the device. For example, the inside diameter of the first member could increase along the direction of movement of the second member. Other configurations are not ruled out.

A nozzle is also provided to suitably discharge fluid out of the device. The nozzle may be formed integral with the second member or it may be a separate part attached to the second member. The nozzle may be configured to discharge a fan stream of fluid out of the device. This allows an increased area in surfaces of parts in motor vehicles, such as motor vehicle headlights, sensors, etc. to be efficiently washed. The nozzle may be configured to discharge a fan stream of fluid covering an angle of about 15-45°. The fan angle of the stream of fluid that is ejected or discharged from the device may be of course varied depending on the application to which the device is directed and the position of the nozzle. In other cases, the nozzle may be adapted to eject or discharge fluid according to a solid stream for promoting stability such as against wind when the vehicle is running, etc. The nozzle may be configured to provide different ejection modes.

It is preferred that the present device further includes spring means, such as a compression spring, arranged to oppose the movement of the second member relative to the first member.

The present fluid-ejection device has been found to provide a very efficient, highly uniform stream of fluid capable of reaching a wide range of areas without relying on spring valve means as in known devices. The present fluid-ejection device has been found to be very advantageous since the fluid outlet position can be easily varied by modifying the nozzle position as required due to the design of the control member to define second member strokes along or during which fluid is, or it is not, allowed to be discharged from the device.

A sweeping effect may be provided as required. This may be carried out by ejecting a stream of fluid as the second member is driven, that is, along or during the second stroke of the second member. As a result, an efficient washing effect is accomplished causing dirt to be efficiently removed.

Sealing means are preferably provided between the first member and the second member. The sealing means may comprise a ring-shaped seal. It may be attached to the second member, for example. The sealing means may act as a one-way valve means, such as a check valve, associated with the second member. This prevents the fluid supplied from returning back into the source of pressurized fluid when the fluid-ejection device is not actuated. With the above configuration, the exact position of fluid ejection can be precisely controlled. Thus, the second telescopic member is driven by the pressurized washing fluid as it pushes the sealing means when supplied into the first telescopic member.

In some embodiments, a telescoping device for a fluid-ejection device includes a first tubular member extending along a direction of extension. A second tubular member is disposed at least partly within the first tubular member, and at least one of the first and second tubular members is movable with respect to the other of the first and second tubular members. A third tubular member is disposed at least partly within and partially outside of the second tubular member. At least one of the second and third tubular members is movable to the other of the second and third tubular members. A seal member is provided, including a first outer surface engaged with an inner surface of the first tubular member, a second inner surface engaged with the second tubular member, and a third inner surface arranged to be engaged with a portion of the third tubular member outside of the second tubular member.

In some embodiments, a radial seal member for a fluid-ejection device includes a radially outer portion including a first sealing surface facing radially outward. A first inner portion extends radially inward from the radially outer portion, and includes a second sealing surface dispfacingosed radially inward. A second inner portion extends axially and radially inward from the first inner portion, and includes a third sealing surface facing radially inward, with a smaller inner diameter than the second surface inner diameter.

Additional objects, advantages and features of examples of the present fluid-ejection device will become apparent to those skilled in the art upon examination of the description, or may be learned by practice thereof.

BRIEF DESCRIPTION OF THE DRAWINGS

Particular implementations of the present fluid-ejection device will be described in the following by way of non-limiting examples, with reference to the appended drawings, in which:

FIG. 1 is a sectional view where one example of the present fluid-ejection device has been shown in a rest position;

FIG. 2 is a sectional view where one example of the present fluid-ejection device has been shown in an operating position at the end of a first stroke;

DETAILED DESCRIPTION OF THE INVENTION

Figure 3:
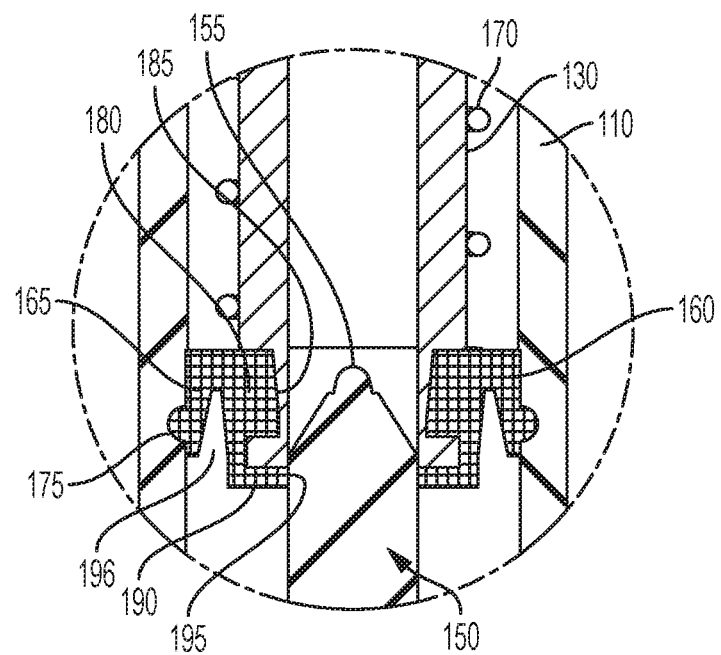
FIG. 3 is a sectional view of a position for the fluid-ejection device shown in FIG. 2.

The device 100 that is described hereinbelow according to the example shown in the figures can be applied in the field of motor vehicles. However, it may be useful in many other different applications where at least a surface 10 has to be washed. In the particular examples, the present fluid-ejection device 100 illustrated in the FIGS. 1-5 of the drawings is adapted to eject a washing liquid against a surface 10 in a motor vehicle part 15 such as a camera lens, a sensor, vision and detection elements, and other parts installed in the vehicle, etc.

The fluid-ejection device 100 shown in the drawings comprises first and second telescopic members 110, 130, a source of pressurized fluid 120, a nozzle 140, a control member 150, sealing means 160, and spring means 170.

The first telescopic member 110 is a fixed member that is connected to the source of pressurized fluid 120 that supplies a pressurized washing liquid in the present non-limiting example shown. Here, the pressure of the washing liquid to be supplied may be, for example, of the order of 1-3 Kg/cm$^2$.

The second telescopic member 130 is a displaceable member that is arranged inside the first telescopic member 110 and can be moved relative thereto when the washing liquid is fed within the first telescopic member 110. Thus, the second telescopic member 130 is driven by the pressurized washing liquid as it pushes the sealing means 160 when supplied into the first telescopic member 110.

The control member in the example shown comprises a post 150 that is part of the first telescopic member 110. However, the post 150 could be a separate part attached to the first telescopic member 110 if necessary. In the example shown, the post 150 is a cylinder having a top pointed tip 155. This specific shape of the post 150 facilitates positioning of the second telescopic member 130 surrounding the post 150, above all, when the second telescopic member 130 returns to its rest position.

Figure 5:
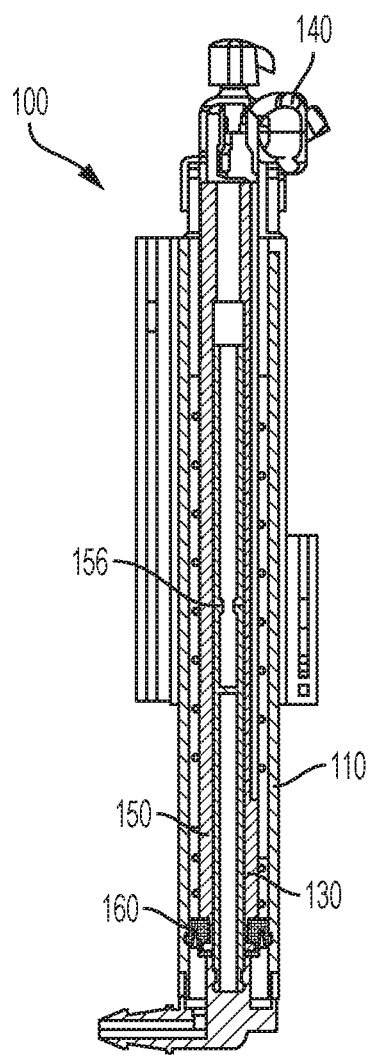
FIG. 5 is a general elevational view of a further example of the present fluid-ejection device.
Figure 6:
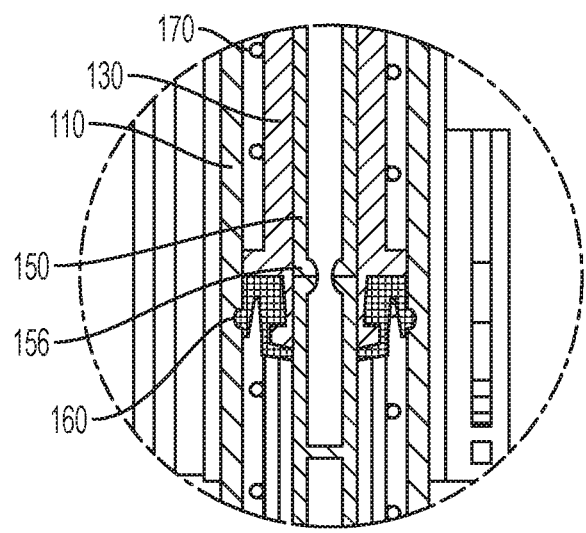
FIG. 6 is a sectional view showing the example of the fluid-ejection device illustrated in FIG. 5.

In the particular example shown in FIG. 5, the post 150 comprises a hollow cylinder having a number of through holes 156 as show in detail in FIG. 6 of the drawings. The washing liquid is allowed to be discharged through said through holes 156 into the second telescopic member 130. The through holes 156 are formed at a side portion of the hollow cylinder.

When a washing operation is to be performed, a washing fluid enters through the first member 110. From the rest position shown in FIG. 1, the washing fluid cause the second member 130 to move upwards in the drawings. The second member 130 thus moves relative to the post 150 such that the second member 130 can be arranged in a first, rest condition shown in FIG. 1 and in a second, operating condition shown in FIG. 2.

In the first, rest condition, shown in FIG. 1, the post 150 is positioned inside the second member 130 preventing the washing liquid from flowing through the second member 130. In this first condition, a first stroke S1 for the second member 130 is defined. Along or during the first stroke S1 of the second member 130 shown in FIG. 2 no washing liquid is allowed to be discharged out of the fluid-ejection device 100. In this way, an initial displacement corresponding to said first stroke S1 of the second member 130 can be established along or during which no washing liquid is ejected or discharged out of the fluid-ejection device 100. As a result, parts 15 or surfaces 10 which must be prevented from getting wet are avoided such that they are not damaged.

In the second, operating condition, shown in FIG. 2, the second member 130 is moved until the post 150 is positioned outside the second member 130 allowing the washing liquid to flow through the second member 130. In such second condition, a second stroke S2 for the second member is defined as shown in FIG. 2. Along or during the second stroke S2 of the second member 130 the washing liquid is allowed to be discharged out of the fluid-ejection device 100. The discharge of washing liquid as the second member 130 moves relative to the first member 110 along or during the second stroke S2 allows a sweeping effect to be provided with the washing fluid stream uniformly distributed against the surface 10 of the part 15 being washed. An efficient washing effect is thus accomplished causing dirt to be efficiently removed from the surface 10 of the part 15.

The passage of washing liquid can be thus precisely varied by varying the height of the post 150 as required. For example, the height of the post 150 can be made to substantially correspond to the above mentioned initial displacement of the second member 130, that is, the first stroke S1 of the second member 130, during which no washing liquid is allowed to be ejected outside the device 100. A number of interchangeable posts 150 may be thuds provided having different heights. Consequently, the device 100 can be designed to adapt to a large number of applications and to a great number of different parts regardless of their shape by simply varying such parameter as required. A wide range of applications can be thus covered with a single fluid-ejection device 100.

In general, it may be preferred that a section for the passage of washing liquid through the first member 110 increases along the direction of movement of the second member 130 to discharge washing liquid out of the device 100. For example, if the first and second members 110, 130 are cylindrical in shape as shown in the examples, the inside diameter of the first member 110 could increase along the direction of movement of the second member 130. Other configurations are also possible as required according to the specific application of the device 100.

The nozzle 140 is attached to the second member 130 and it is adapted to discharge the washing liquid out of the device 100 during the second stroke S2 of the second member 130. The nozzle 140 in the device 100 of the example is capable of providing a fan stream of washing liquid covering an angle of about 15-45°.

Figure 4:
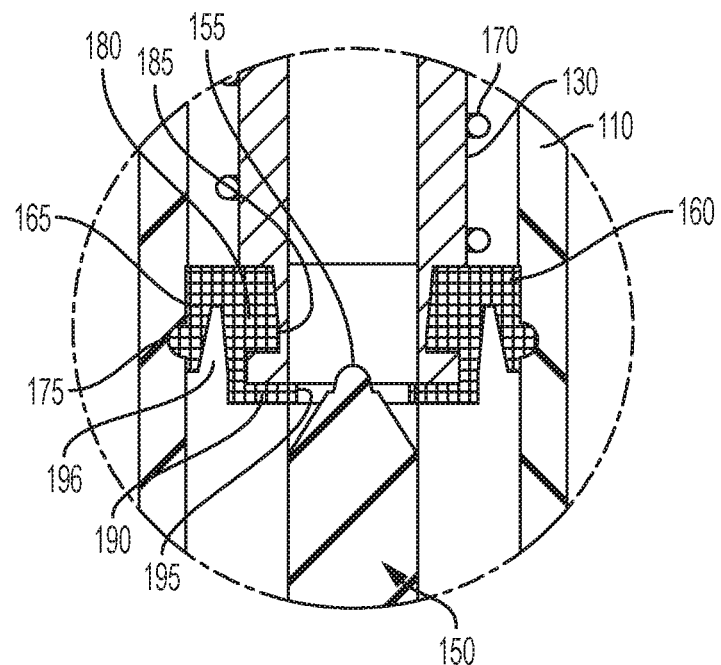
FIG. 4 is a sectional view of a position for the fluid-ejection device at the beginning of a second stroke.

The sealing means in the example shown comprises a ring-shaped seal member 160 member arranged between the first member 110 and the second member 130. The seal member 160 is attached to the second member 130 and it is also configured to act as a one-way valve means to allow the washing liquid that is supplied by the source of pressurized washing liquid 120 to enter therein, and such that when the fluid-ejection device 100 is not actuated, the washing liquid is not allowed to return back to the source of pressurized washing liquid 120. The seal member 160 can be made of any type of elastomeric material that is compatible with the plastic materials or metallic materials used for the first, second or control members (e.g., polyoxymethylene, aluminum). Examples of elastomeric materials that can be used for the seal member 160 include rubber (e.g., neoprene, polybutadiene, silicone rubbers), or vulcanized thermoplastic or other plastic material (e.g., polyurethane). As shown in FIGS. 3 and 4, the seal member 160 includes a radially outer or peripheral portion 165 with a first outer surface 175 on of the seal member 160 engaged with the first member 110, a first central or radially inner portion 180 of the seal member 160 with a second surface 185 facing inward and engaged with the second member 130, and a second central or radially inner portion 190 of the seal member 160 with a third surface 195 facing inward. As shown in FIG. 3, the third surface 195 is arranged to be engaged with the control member 150 when the control member 150 is in the first condition, and has a smaller inner diameter than the smallest inner diameter of the second surface 185. As can be further appreciated by the re-positioning between FIGS. 3 and 4 of the second member 130 and seal member 160 with respect to the first member 110 and control member 150, the first and third surface 175 and 195 are slideably engaged with the first and control members 110 and 150, respectively, while the second surface 185 is fixedly engaged with the second member 130. The angled cut-out portion of the second member 130 that receives the second surface 175 provides a retention feature for securing the seal member 160 to the second member 130. In some embodiments, the third portion 190 of the seal member 160 can extend radially inward directly from the second portion 180. In some embodiments as shown in FIGS. 1-6, the third portion 190 of the seal member 160 can extend axially and radially inward from the second portion 180. In some embodiments, the third portion 190 of the seal member 160 can extend radially inward directly from the second portion 180. In some embodiments as shown in FIGS. 5 and 6, the third portion 190 of the seal member 160 can be elastically deformable in an axial direction (i.e., direction of the strokes S1 and S2) in response to relative movement of the second member 130 and the control member 150, which can promote maintaining a surface contact angle and therefore a good seal with the control member 150. As further shown in FIGS. 3 and 4, the seal member 160 is arranged to have a recess 196 between the peripheral and first central portions of the seal member 160. The recess 196 is open to the direction of the fluid source 120 so that fluid pressure will tend to urge the first surface 165 into sealing contact with the first member 110. The sealing means described above can avoid the necessity of a separate O-ring in the control member 150, which can allow for injection molding of devices with advantageously reduced distance between the outer surface of the control member 150 and the inner surface of the first member 110. In some embodiments, the distance between the outer surface of the control member 150 and the inner surface of the first member 110 is less than 6 mm. In some embodiments, the distance is less than 5 mm. In some embodiments, the distance is in a range of 3-6 mm. In some embodiments, the distance is in a range of 3-5 mm.

The spring means in the example shown comprise a compression spring 170 that is arranged to oppose the movement of the second member 130 relative to the first member 110. Thus, as the second member 130 is driven by the washing liquid supplied by the source of pressurized washing liquid 120, the spring 170 is compressed, and when no washing liquid is supplied, the spring 170 causes the second member 130 to be displaced back to a rest position, telescopically housed within the first member 110 in its inoperative state.

Although only a number of particular examples of the present fluid-ejection device have been disclosed herein, it will be understood by those skilled in the art that other alternative examples and/or uses and obvious modifications and equivalents thereof are possible. The present disclosure thus covers all possible combinations of the particular examples described of the fluid-ejection device. The scope of the present disclosure should not be limited by particular examples, but should be determined only by a fair reading of the claims that follow.

What is claimed is:

1. A fluid-ejection device comprising:
    a first member having an inlet suitable for being connected to a source of fluid;
    a second member that can be moved relative to the first member;
    a control member arranged to be at least in:
        a first condition, in which the control member is at least substantially inside the second member preventing the flow of fluid through the second member to define a first stroke of the second member where no discharge of fluid is allowed out of the device; and
        a second condition, in which the control member is at least substantially outside the second member allowing the flow of fluid through the second member to define a second stroke of the second member along which discharge of fluid is allowed out of the device; and
    a seal member comprising a first elastomeric surface engaged with the first member, a second elastomeric surface engaged with the second member, and a third elastomeric surface arranged to be engaged with the control member in the first condition.

2. The device of claim 1, wherein the first elastomeric surface is slideably engaged with the first member, the second elastomeric surface is fixedly engaged with the second member, and the third elastomeric surface is arranged to be slideably engaged with the control member in the first condition.

3. The device of claim 1, wherein the seal member comprises a peripheral elastomeric portion comprising said first elastomeric surface, a first central elastomeric portion comprising said second elastomeric surface, and a second central elastomeric portion comprising said third elastomeric surface.

4. The device of claim 3, wherein the second central elastomeric portion extends radially inward from the first central elastomeric portion, and is elastically deformable in an axial direction in response to relative movement of the second member and the control member.

5. The device of claim 3, wherein the seal member includes a recess between the first central elastomeric portion and the peripheral elastomeric portion, said recess being open in a direction of the source of fluid.

6. The device of claim 1, wherein a distance from an outer surface of the control member to an inner surface of the first member is 3-6 mm.

7. The device of claim 1, wherein the control member comprises a post.

8. The device of claim 1, wherein the control member comprises a hollow post having holes through which fluid is allowed to be discharged into the second member.

9. The device of claim 8, wherein the holes are formed at different heights in the post.

10. The device of claim 1, wherein a section for the passage of fluid through the first member increases between the first condition and the second condition.

11. The device of claim 1, wherein the control member is part of or is attached to the first member.

12. The device of claim 1, wherein the second member comprises at least one nozzle to discharge fluid out of the device.

13. The device of claim 12, wherein the nozzle is configured to discharge a fan stream of fluid out of the device.

14. The device of claim 1, wherein it includes a one-way valve associated with the second member to allow the fluid supplied by the source of fluid to enter therein.

15. The device of claim 14, wherein the one-way valve is formed in the seal member.

16. The device of claim 1, wherein it further includes a spring arranged to oppose the movement of the second member relative to the first member.

17. A telescoping device for a fluid-ejection device, the telescoping device comprising:
- a first tubular member extending along a direction of extension;
- a second tubular member disposed at least partly within the first tubular member, wherein at least one of the first and second tubular members is movable with respect to the other of the first and second tubular members;
- a third tubular member disposed at least partly within and partially outside of the second tubular member, wherein at least one of the second and third tubular members is movable to the other of the second and third tubular members; and
- a seal member comprising a first elastomeric outer surface engaged with an inner surface of the first tubular member, a second elastomeric inner surface engaged with the second tubular member, and a third elastomeric inner surface arranged to be engaged with a portion of the third tubular member outside of the second tubular member.

18. A radial seal member for a fluid-ejection device, the radial seal member comprising:
- an elastomeric radially outer portion including a first elastomeric radially outer-facing sealing surface facing radially outward;
- an elastomeric first inner portion extending radially inward from the radially outer portion, the first inner portion including a second elastomeric sealing surface facing radially inward; and
- an elastomeric second inner portion extending from the first inner portion, the second inner portion including a third elastomeric sealing surface facing radially inward, said third elastomeric sealing surface having a smaller inner diameter than the second elastomeric surface inner diameter.

19. The radial seal member of claim 18, wherein the second inner portion extends axially and radially inward from the first inner portion.

20. The radial seal member of claim 19, wherein the second central portion is elastically deformable in an axial direction.

* * * * *